(12) United States Patent
Huang et al.

(10) Patent No.: US 11,234,269 B2
(45) Date of Patent: *Jan. 25, 2022

(54) VIRTUAL CARRIER SENSING WITH TWO NETWORK ALLOCATION VECTORS

(71) Applicant: Intel Corporation, Santa Clara, CA (US)

(72) Inventors: Po-Kai Huang, San Jose, CA (US); Qinghua Li, San Ramon, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,496

(22) Filed: Feb. 21, 2020

(65) Prior Publication Data

US 2020/0196352 A1 Jun. 18, 2020

Related U.S. Application Data

(63) Continuation of application No. 15/773,644, filed as application No. PCT/US2016/040091 on Jun. 29, 2016, now abandoned.

(Continued)

(51) Int. Cl.
*H04W 74/08* (2009.01)
*H04W 8/26* (2009.01)
*H04W 84/12* (2009.01)

(52) U.S. Cl.
CPC ......... *H04W 74/0808* (2013.01); *H04W 8/26* (2013.01); *H04W 74/0816* (2013.01); *H04W 84/12* (2013.01)

(58) Field of Classification Search
None
See application file for complete search history.

(56) References Cited

U.S. PATENT DOCUMENTS

2010/0054213 A1 3/2010 Trainin
2011/0080977 A1* 4/2011 Liu ............... H04W 72/005
375/316

(Continued)

FOREIGN PATENT DOCUMENTS

WO WO-2015050385 A1 4/2015
WO WO-2017078801 A1 5/2017

OTHER PUBLICATIONS

U.S. Appl. No. 15/773,644, filed May 4, 2018, Virtual Carrier Sensing With Two Network Allocation Vectors.

(Continued)

*Primary Examiner* — Peter Chen
*Assistant Examiner* — Jeff Banthrongsack
(74) *Attorney, Agent, or Firm* — Schwegman Lundberg & Woessner, P.A.

(57) ABSTRACT

Methods, computer readable media, and wireless apparatuses are disclosed for virtual carrier sensing with two network allocation vectors (NAV). An apparatus of a wireless device is disclosed. The apparatus comprising processing circuitry configured to: determine a duration of a frame, determine whether the frame is an intra basic service set (Intra-BSS) frame, an inter-BSS frame, or an unclassified frame. The processing circuitry may be further configured to set an intra-BSS network allocation vector (NAV) to the duration of the frame, if the frame is determined to be the intra-BSS frame, and if a receiver address is decoded from the frame and the receiver address is not an address of the wireless device. The processing circuitry may be further configured to set a regular NAV to the duration of the frame, if the frame is determined to be the inter BSS frame or the unclassified frame.

20 Claims, 9 Drawing Sheets

Related U.S. Application Data

(60) Provisional application No. 62/250,828, filed on Nov. 4, 2015.

(56) References Cited

U.S. PATENT DOCUMENTS

| | | | |
|---|---|---|---|
| 2012/0063446 | A1 | 3/2012 | Chu et al. |
| 2015/0264578 | A1 | 9/2015 | Chaves et al. |
| 2017/0094685 | A1* | 3/2017 | Noh .................... H04W 72/042 |
| 2018/0324855 | A1 | 11/2018 | Huang et al. |
| 2018/0376423 | A1* | 12/2018 | Atefi ................... H04W 52/146 |

OTHER PUBLICATIONS

"U.S. Appl. No. 15/773,644, Examiner Interview Summary dated Jan. 16, 2020", 3 pgs.

"U.S. Appl. No. 15/773,644, Examiner Interview Summary dated Aug. 28, 2019", 3 pgs.

"U.S. Appl. No. 15/773,644, Final Office Action dated Dec. 27, 2019", 28 pgs.

"U.S. Appl. No. 15/773,644, Non Final Office Action dated Jul. 18, 2019", 29 pgs.

"U.S. Appl. No. 15/773,644, Response filed Jan. 21, 2020 to Final Office Action dated Dec. 27, 2019", 12 pgs.

"U.S. Appl. No. 15/773,644, Response filed Sep. 27, 2019 to Non-Final Office Action dated Jul. 18, 2019", 12 pgs.

"International Application Serial No. PCT/US2016/040091, International Preliminary Report on Patentability dated May 17, 2018", 6 pgs.

"International Application Serial No. PCT/US2016/040091, International Search Report dated Sep. 30, 2016", 3 pgs.

"International Application Serial No. PCT/US2016/040091, Written Opinion dated Sep. 30, 2016", 4 pgs.

Shao, Yu Lien, "Cognitive Radio Resource Management for Future Cellular Networks", IEEE Wireless Communications, (Feb. 2014), 70-79.

* cited by examiner

VIRTUAL CARRIER SENSING WITH TWO NETWORK ALLOCATION VECTORS

PRIORITY CLAIM

This application is a continuation of U.S. patent application Ser. No. 15/773,644, filed May 4, 2018, which is a U.S. National Stage Filing under 35 U.S.C. 371 from International Application No. PCT/US2016/040091, filed Jun. 29, 2016 and published in English as WO 2017/078801 on May 11, 2017, which claims the benefit of priority to U.S. Provisional Patent Application Ser. No. 62/250,828, filed Nov. 4, 2015, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for virtual carrier sensing with two network allocation vectors (NAVs).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
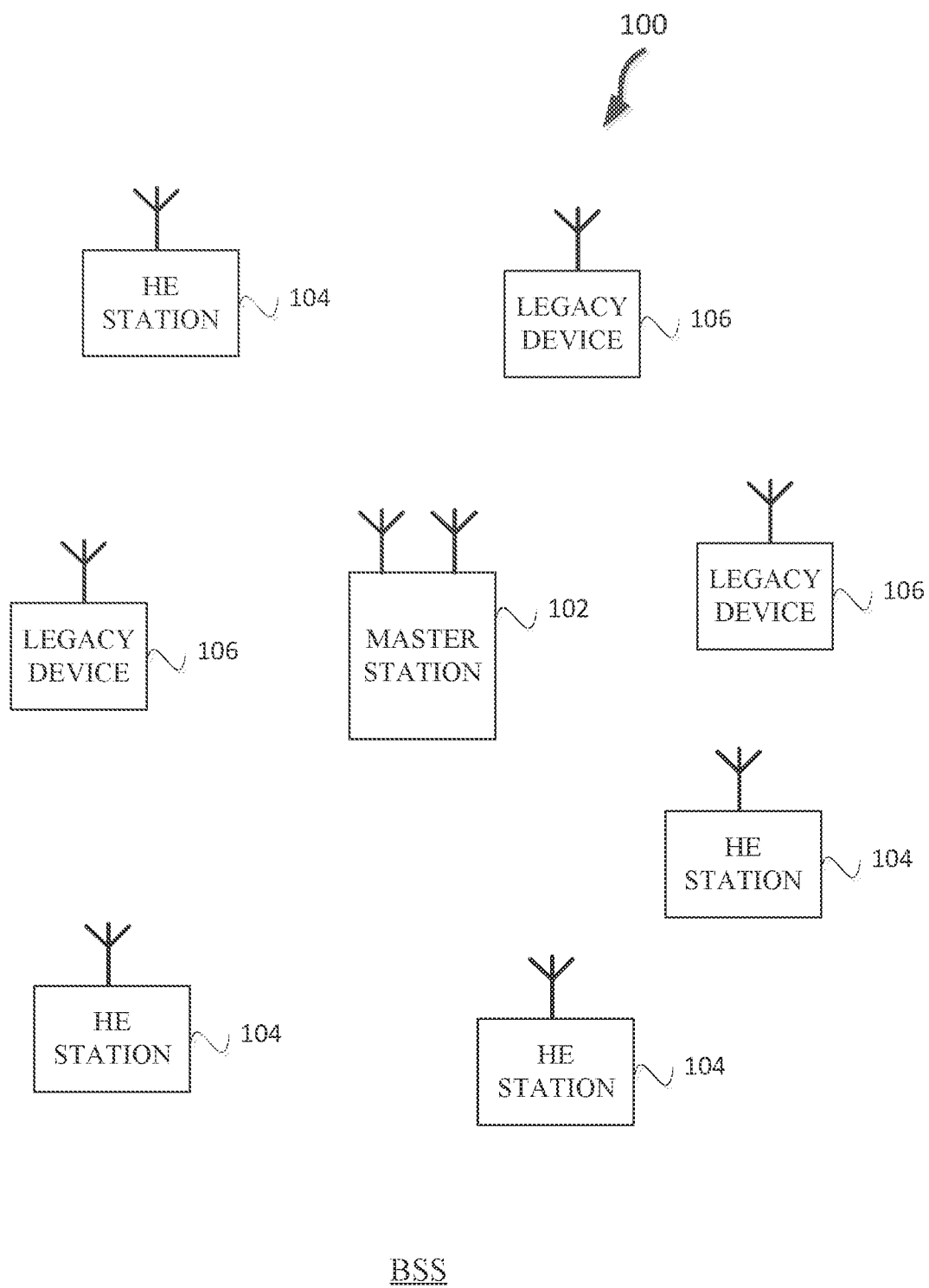
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency (HE) (e.g., IEEE 802.11ax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet.

The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs. The HE stations 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as IEEE 802.11az. In some embodiments, the HE stations 104, master station 102, and/or legacy devices 106 may be termed wireless devices. In some embodiments the HE station 104 may be a "group owner" (GO) for peer-to-peer modes of operation where the HE station 104 may perform some operations of a master station 102.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

In some embodiments, a HE frame may be configurable to have the same bandwidth as a channel. The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20

MHz. In some embodiments the bandwidth of the channels are 26, 52, 104, 242, etc. active data subcarriers or tones that are space 20 MHz apart. In some embodiments the bandwidth of the channels is 256 tones spaced by 20 MHz. In some embodiments a 20 MHz channel may comprise 256 tones for a 256 point Fast Fourier Transform (FFT). In some embodiments, a different number of tones is used.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 102, HE station 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and channel information. During the HE control period, HE stations 104 may communicate with the master station 102 in accordance with a non-contention based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a channel smaller than the operating range of the master station 102. During the HE control period, legacy stations refrain from communicating.

In accordance with some embodiments, during the master-sync transmission the HE STAs 104 may contend for the wireless medium with the legacy devices 106 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate a portions of the TXOP that are contention based for some HE station 104 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE device 104 and/or the master station 102 are configured to perform the methods and operations herein described in conjunction with FIGS. 1-9.

Figure 2:
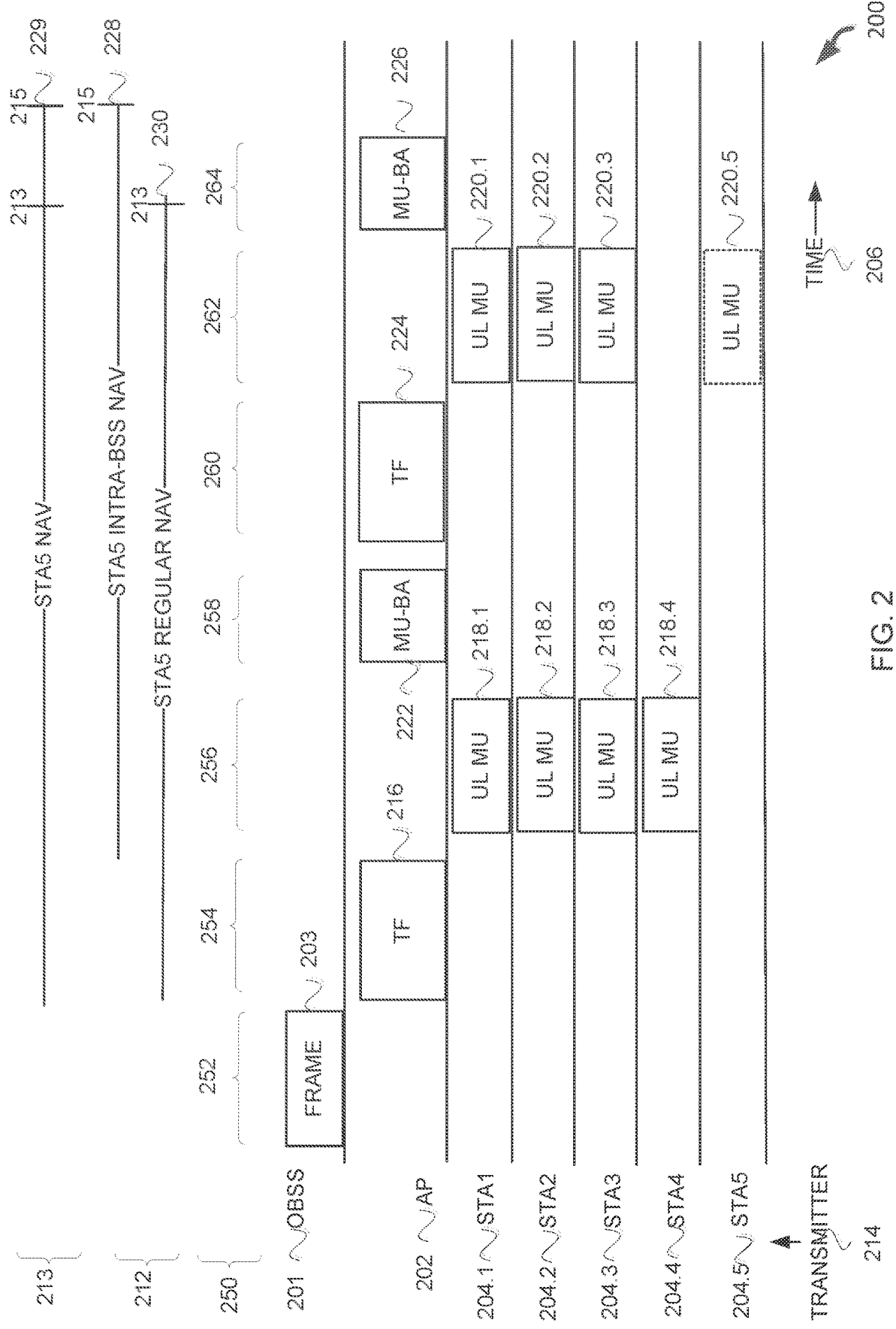
FIG. 2 illustrates a method for virtual carrier sensing with two NAVs and with one NAV in accordance with some embodiments.

FIG. 2 illustrates a method 200 for virtual carrier sensing with two NAVs 212 and with one NAV 213 in accordance with some embodiments. Illustrated in FIG. 2 is time 206 along a horizontal axis, transmitter 214 along a vertical axis, two NAVs 212 along the top, one NAV 213 along the top, operations 250 along the top, OBSS 201, AP 202, and STAs 204. The overlapping BSS (OBSS) may be a HE station 104, legacy device 106, or master station 102 that is associated with a different BSS than STA5 204.5. One NAV 213 illustrates one NAV 213 for STA5 204.5. Two NAVs 212 illustrates two NAVs 212 for STA5 204.5.

The AP 202 may be a master station 102. The STAs 204 may be HE stations 104. The NAVs 212 may be a STA5 intra-BSS NAV 228 and STA5 regular NAV 230. The one NAV 213 may a STA5 NAV 229.

The method 200 starts at operation 252 with the OBSS 201 transmitting a frame 203. The frame 203 is received by STA5 204.5. In the single NAV 213 embodiment, STA5 204.5 sets STA5 NAV 229 to time 213. In the two NAV 212 embodiment, STA5 204.5 sets STA5 regular NAV 230 to time 213.

The method 200 continues at operation 254 with the AP 202 transmitting a trigger frame (TF) 216. The TF 216 includes an UL MU resource allocation for STA 1, 2, 3, 4 204.1, 204.2, 204.3, and 204.4, respectively. In the single NAV 213 embodiment, STA5 204.5 sets STA5 NAV 229 to time 215. In the two NAV 212 embodiment, STA5 204.5 sets STA5 intra-BSS NAV 228 to time 215.

The method 200 continues at operation 256 with the STA 1, 2, 3, 4, 204.1, 204.2, 204.3, 204.4, respectively, transmitting UL MU 218.1, 218.2, 218.3, 218.4, respectively, in accordance with the resource allocation (e.g., FIG. 9, information field) indicated in TF 216.

The method 200 continues at operation 258 with the AP 202 transmitting a MU block acknowledgment (BA) (MU-BA) 222 in response to the UL MU 218.1, 218.2, 218.3, 218.4.

The method 200 continues at operation 260 with the AP 202 transmitting TF 224. The TF 224 includes an UL MU resource allocation for STAs 1, 2, 3, 5, 204.1, 204.2, 204.3, and 204.5, respectively. Note that TF 224 includes a resource allocation for STA5 204.5 and not one for STA4 204.4.

The method 200 continues at operation 262 with STA 1, 2, 3, 204.1, 204.2, 204.3, respectively, transmitting UL MU 218.1, 218.2, 218.3, respectively, in accordance with the resource allocation indicated in TF 224. In the single NAV 213 embodiment, STA5 204.5 determines that it can transmit UL MU 220.5 because STA5 NAV was set by the AP 202 which is an intra BSS wireless device. STA5 204.5 transmitting UL MU 220.5 may cause trouble with OBSS 201 because frame 203 indicated the STA5 204.5 should set a NAV to time 213. But, in the single NAV 213 embodiment, this information is lost because STA5 204.5 overwrote the single NAV 213 STA5 NAV 229 with the indication to set the NAV to time 215 in TF 224.

In the two NAV 212 embodiments, STA5 204.5 determines not to transmit UL MU 220.5 because the STA5 regular NAV 230 is still set to time 213. The STA5 intra-BSS NAV 228 indicates that STA5 204.5 could transmit UL MU 220.5 because it is an intra NAV and STA5 204.5 would be transmitting the AP 202 of the same BSS.

The method 200 continues at operation 264 with AP 202 transmitting a MU BA 226 in response to the UL MUs 220.1, 220.2, and 220.3, and in the embodiment with one NAV UL MU 220.5.

Figure 3:
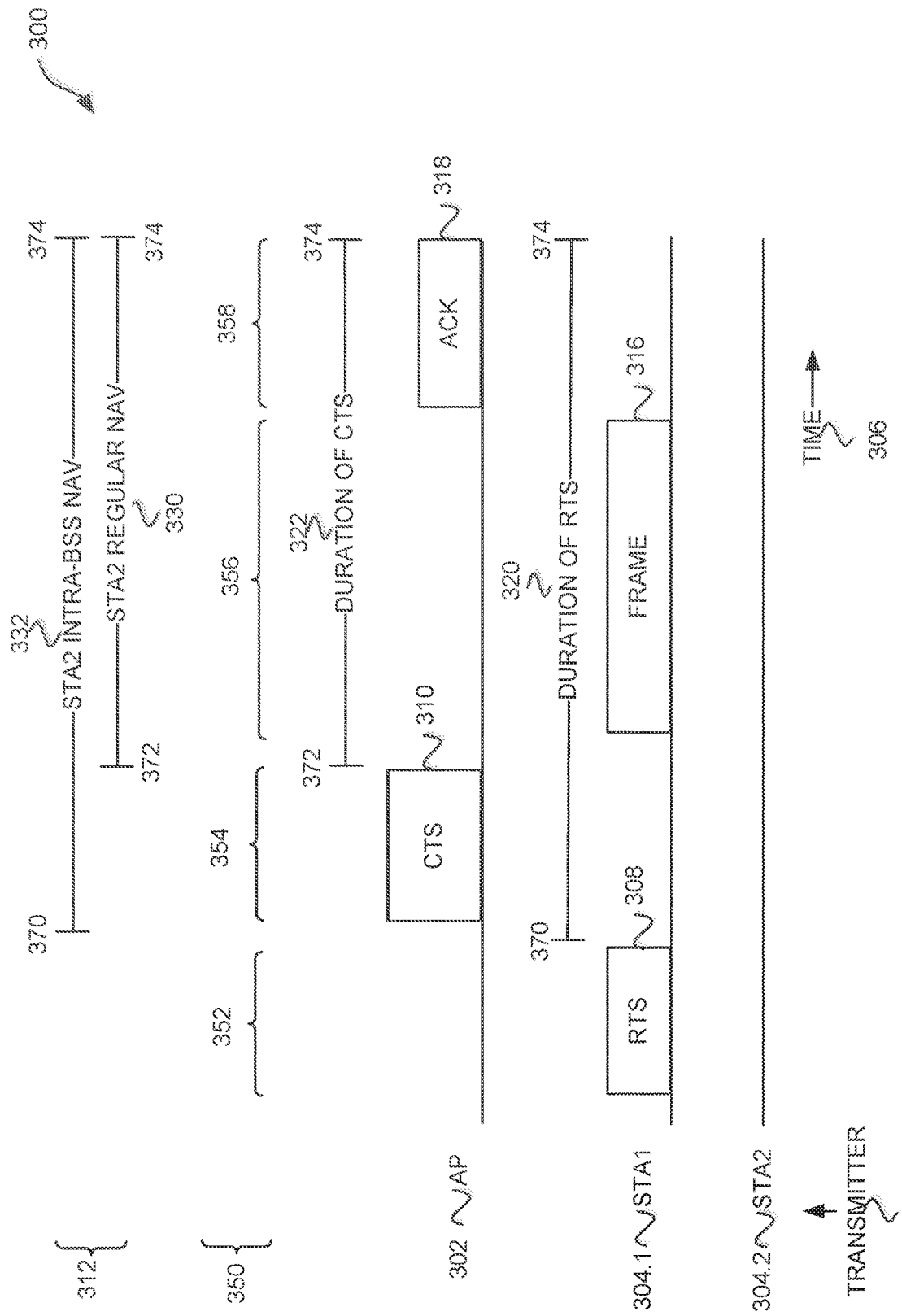
FIG. 3 illustrates a method for virtual carrier sensing with two NAVs, in accordance with some embodiments.

FIG. 3 illustrates a method 300 for virtual carrier sensing with two NAVs 312, in accordance with some embodiments. Illustrated in FIG. 3 is time 306 along a horizontal axis, transmitter 314 along a vertical axis, two NAVs 312 along the top, operations 350 along the top, AP 202, and STAs 204. Two NAVs 312 illustrates two NAVs 312 for STA 2 304.2, STA2 intra-BSS NAV 332 and STA2 regular NAV 330. STA 1 304.1 and STA 2 304.2 may be associated with AP 102.

The method 300 begins at operation 352 with STA1 304.1 transmitting a request-to-send (RTS) 308. The RTS 308 may include a duration of RTS 320 that extends from time 370 to a time 374. The RTS 308 may include a receiver address (RA) (e.g., see receiver address 914) and a transmitter address (TA) (e.g., see FIG. 9 transmitter address 912). STA2 304.2 may then determine that the RTS 308 is an intra or inter frame based on the RA and TA. If the RA or TA are the same as an address of the AP 302, which STA 2 304.2 is associated with, then STA 2 304.2 may set the STA2 intra-BSS NAV 332 to extend to time 374.

The method 300 continues at operation 354 with the AP 302 transmitting CTS 310. The CTS 310 may include only an RA, which may be the address of the transmitter of the RTS, STA1 304.1. The CTS 310 may include a duration of CTS 322 that extends from time 372 to time 374. STA 2 304.2 may receive CTS 310 and not be able to determine if it is an inter or intra frame because the RA may be the address of STA1 304.1 and not the AP 302.

In some embodiments, STA 2 304.2 may set the STA2 regular NAV 330 to time 374. In some embodiments, STA 2 304.2 may have stored the TA and RA addresses from the RTS 308 and determine that the CTS 310 is an intra frame. STA 2 304.2 may set STA2 intra-BSS NAV 332 to time 374 or leave STA2 intra-BSS NAV 332 at time 374 without setting it again.

The method 300 continues at operation 356 with STA1 304.1 transmitting frame 316. The method 300 continues at operation 358 with the AP 302 transmitting the ACK 318.

Figure 4:
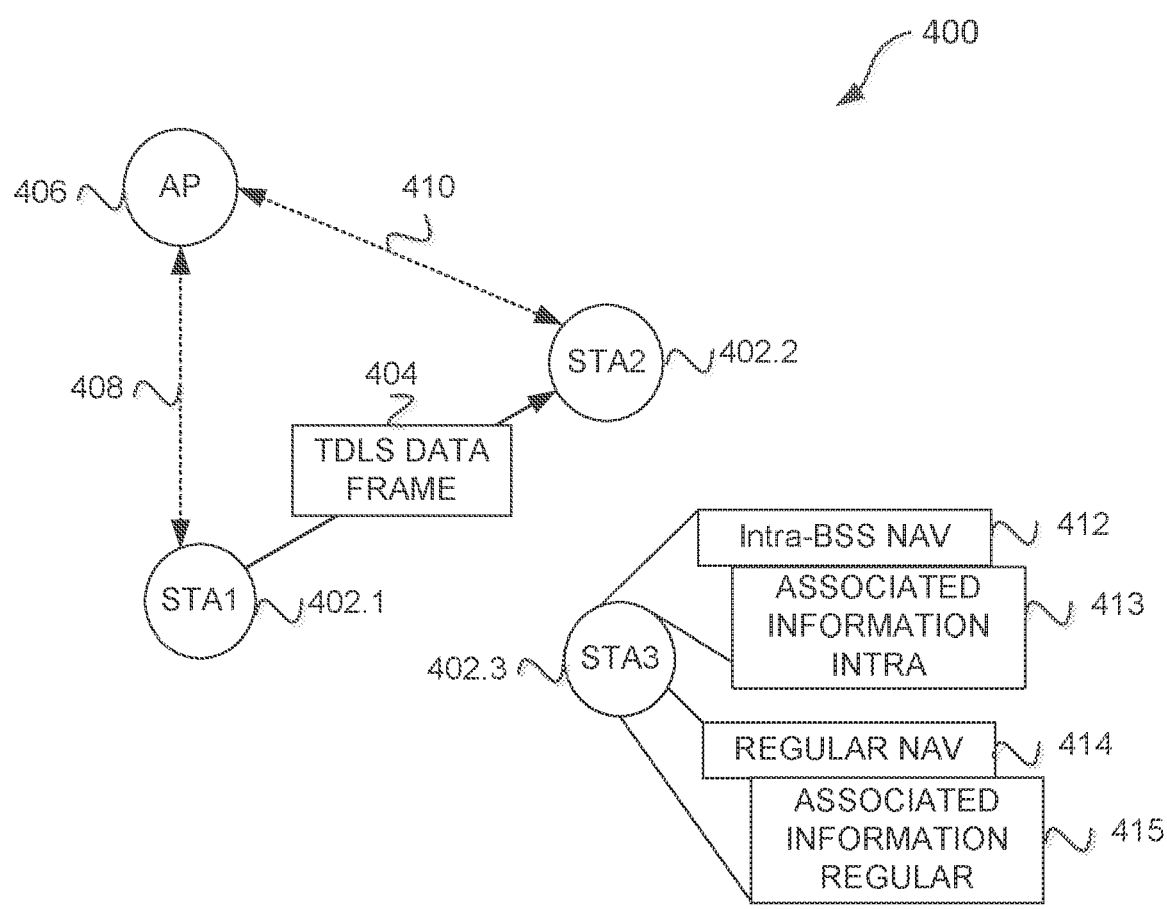
FIG. 4 illustrates a method for virtual carrier sensing with two NAVs, in accordance with some embodiments.

FIG. 4 illustrates a method 400 for virtual carrier sensing with two NAVs, in accordance with some embodiments. Illustrated in FIG. 4 is AP 406, STA1 402.1, STA2 402.2, STA3 402.3, and tunneled direct link setup (TDLS) data frame 404.

STA 1 402.1 and STA 2 402.2 may have set up TDLS through the AP 406 via transmissions 408 and 410. STA 1 402.1 may transmit TDLS data frame 404 to STA 2 402.2. STA 1 402.1, STA 2 402.2, STA 3 402.3, and AP 406 may all be part of a same BSS with a same BSSID. The MAC header of the TDLS data frame 404 may be decoded by other STAs such as STA 3 402.3. TDLS data frame 404 includes a duration, RA and TA, which may be equal to the address of STA 1 402.1 and STA 2 402.2, respectively. TDLS data frame 404 may also include a BSSID. STA 3 402.3 includes an intra-BSS NAV 412 and a regular NAV 414 in accordance with some embodiments. In some embodiments, the intra-BSS NAV 412 includes an associated information intra 413. In some embodiments, the regular NAV 414 includes an associated information regular 415.

STA 3 402.3 may set a regular NAV 414 based on the BSSID and the duration in the TDLS data frame 404. STA 3 402.3 may be configured to determine that TDLS data frame 404 is a TDLS frame because the RA and TA do not equal an address of the AP 306, and because the BSSID does equal the address of the AP 306. STA 3 402.3 may set associate information regular 415 with an indication that the intra-BSS NAV 412 was set by a TDLS frame and that the TXOP holder address is TA (address of STA 1 402.1).

If STA 3 402.3 is scheduled for UL MU response from the AP 406, then the STA 3 402.3 may determine whether to respond or not based on the associated information intra 413. For example, STA 3 402.3 may determine that the intra-BSS NAV 412 was set by TDLS based on associated information intra 413. Based on this determination, the STA 3 402.3 may determine not to transmit UL MU data as scheduled by the AP 406. In some embodiments, STA 3 402 may have only a single NAV and an associated information with the single NAV.

In some embodiments, STA 3 402.3 sets the regular NAV 414 based on the TDLS data frame 404 instead of the intra-BSS NAV 412. As a result, the regular NAV 414 can be reset when an Intra-BSS CF-End is sent.

Figure 5:
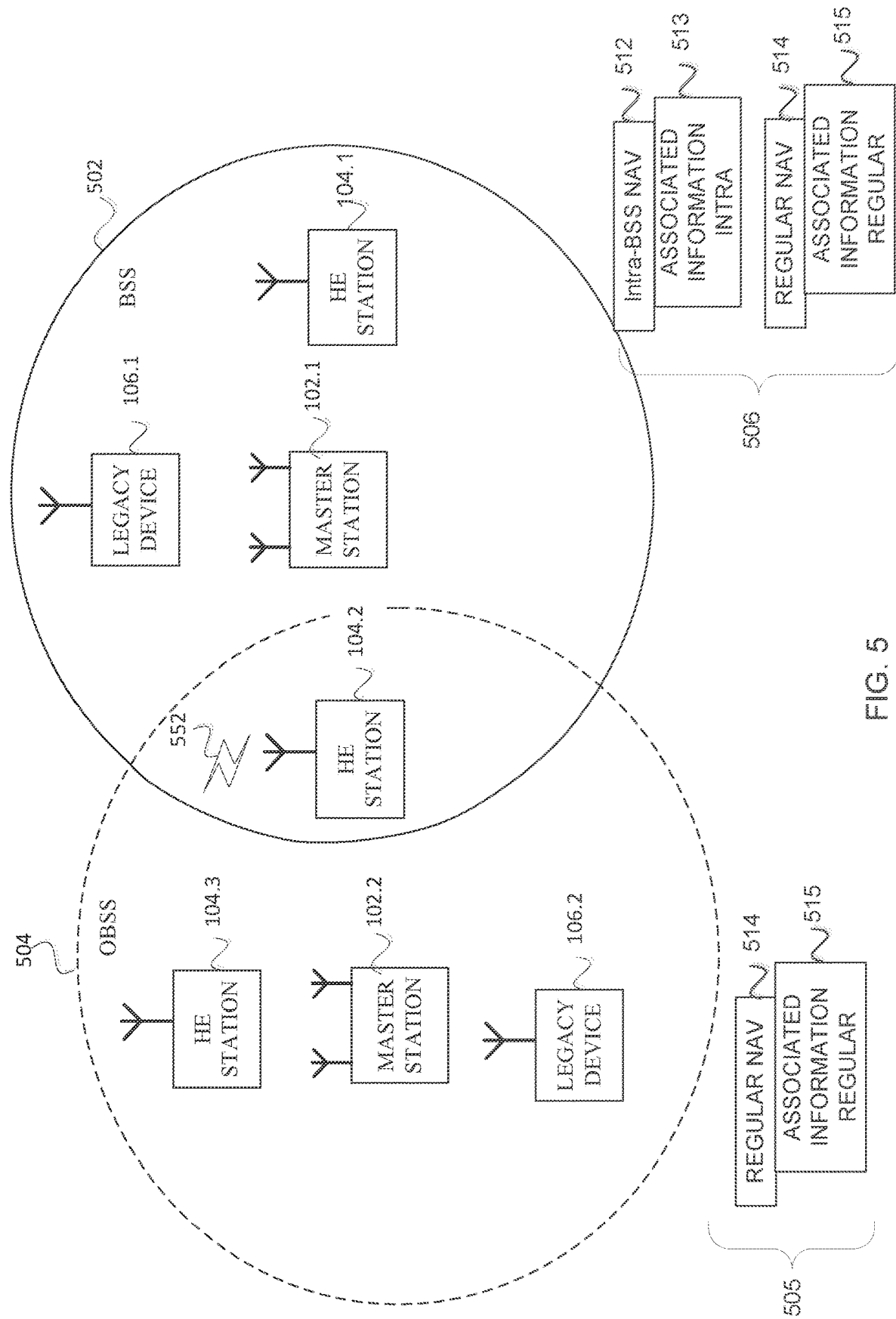
FIG. 5 illustrates virtual carrier sensing with two NAVs and with one NAV in accordance with some embodiments.

FIG. 5 illustrates virtual carrier sensing with two NAVs 506 and with one NAV 505 in accordance with some embodiments. Illustrated in FIG. 5 are the transmission range 502 of a basic service set (BSS), the transmission range 504 of an overlapping BSS (OBSS), master stations 102, transmission 552, HE stations 104, legacy devices 106, one NAV 505, and two NAVs 506. Master station 102.1 may be the master station 102.1 of transmission range 502 of BSS. Master station 102.2 may be the master station 102.2 of transmission range 504 of OBSS. Transmission 552 may be frame from one of the legacy devices 106, master stations 102, or HE stations 104. HE stations 104.1 and 104.2 may be attached to master station 102.1. HE station 104.3 may be attached to master station 102.2. Legacy device 106.1 may be attached to master station 102.1. Legacy device 106.2 may be attached to master station 102.2.

HE station 104.2 includes two NAVs 506, which includes an intra-BSS NAV 512 and a regular NAV 514 in accordance with some embodiments. HE station 104.2 includes one NAV 505, which includes a regular NAV 514 in accordance with some embodiments. In some embodiments, the intra-BSS NAV 512 includes an associated information intra 513. In some embodiments, the regular NAV 514 includes an associated information regular 515. HE station 104.2 includes one NAV 505, which includes a regular NAV 514 in accordance with some embodiments. HE station 104.2 may receive transmission 552. The HE station 104.2 may be configured to associate with a master station 102.1. The HE station 104.2 may then decode a second packet from the master station 102.1. The second packet may include an address of the master station 102.1 and/or a BSS color (see FIG. 9, color 919).

The HE station 104.2 may set a BSS classifier as the address of the master station 102.1 and/or may store the BSS color. The BSS classifier may be part of the associated information intra 513 and/or associated information regular 515. The transmission opportunity (TXOP) holder address is the transmitter MAC address of a packet. The HE station 104.2 may store the TXOP holder address in the associated information intra 513 if the frame is determined to be an intra-BSS NAV 512, and the intra-BSS NAV 512 is set to the duration of the frame. In some embodiments, the HE station 104.2 will only store the TXOP holder address in the associated information intra 513 if RA address of the packet is the same as the address of the HE station 104.2.

In some embodiments, the HE station 104.2 is configured as follows: if the HE station 104.2 receives transmission 552, which is a frame, and if the regular NAV 514 is set to a duration of the frame, and the frame comprises a second BSSID different than a BSSID of the master station 102.1, then the HE station 104.2 sets a second BSSID as a second BSS classifier, which may be part of the associated information regular 515; and, if the regular NAV 514 is set to the duration, and the frame comprises a transmitter address, or a receiver address if the frame is a clear-to-send (CTS) frame, the HE station 104.2 stores the transmitter address or the receiver address as a transmission opportunity (TXOP) holder, which may be included with the associated information regular 515.

In some embodiments, the HE station 104.2 is configured as follows: if the HE station 104.2 receives transmission 552, which is a frame, if the intra-BSS NAV is set to a duration of the frame, and the frame comprises a second BSSID, the HE station 104.2 sets the second BSSID as a second BSS classifier, which may be included with the associated information intra 513; and, if the intra-BSS NAV is set to the duration, and the frame comprises a transmitter address, or a receiver address if the frame is a clear-to-send (CTS) frame, the HE station 104.2 stores the transmitter address or the receiver address as a transmission opportunity (TXOP) holder with the associated information intra 513.

The HE station 104.2 may store the BSSID or BSS color in associated information regular 515 if the packet is determined to be an inter-BSS (e.g., OBSS) packet.

The HE station 104.2 may be configured to not contend if intra-BSS NAV 512 or regular NAV 514 has not expired (e.g., reached zero). In some embodiments, intra-BSS NAV 512 will not be considered for a response to UL MU for the HE station 104.2. For example, the intra-BSS NAV 512 may be set and the HE station 104.2 may receive a trigger frame from the master station 102.1. The HE station 104.2 would then ignore the intra-BSS NAV 512 being set and respond in accordance with the resource allocation in the UL MU trigger frame.

The transmission 552 may be a contention free (CF)-end. If the incoming frame is an intra-BSS CF-End, then the HE station 104.2 may reset the intra-BSS NAV 512. If the CF-end is an intra-BSS CF-End, and there is no recorded BSSID in the associated information regular 515 with regular NAV 514, then the HE station 104.2 may reset the regular NAV 514. If the HE station 104.2 cannot determine whether the frame is an intra or inter (e.g. OBSS 504) frame, then the HE station 104.2 may reset Intra-BSS NAV 512, and, in some embodiments, regular NAV 514. If the HE station 104.2 receives an inter-BSS CF-End, the HE station 104.2 resets the regular NAV 514.

Figure 6:
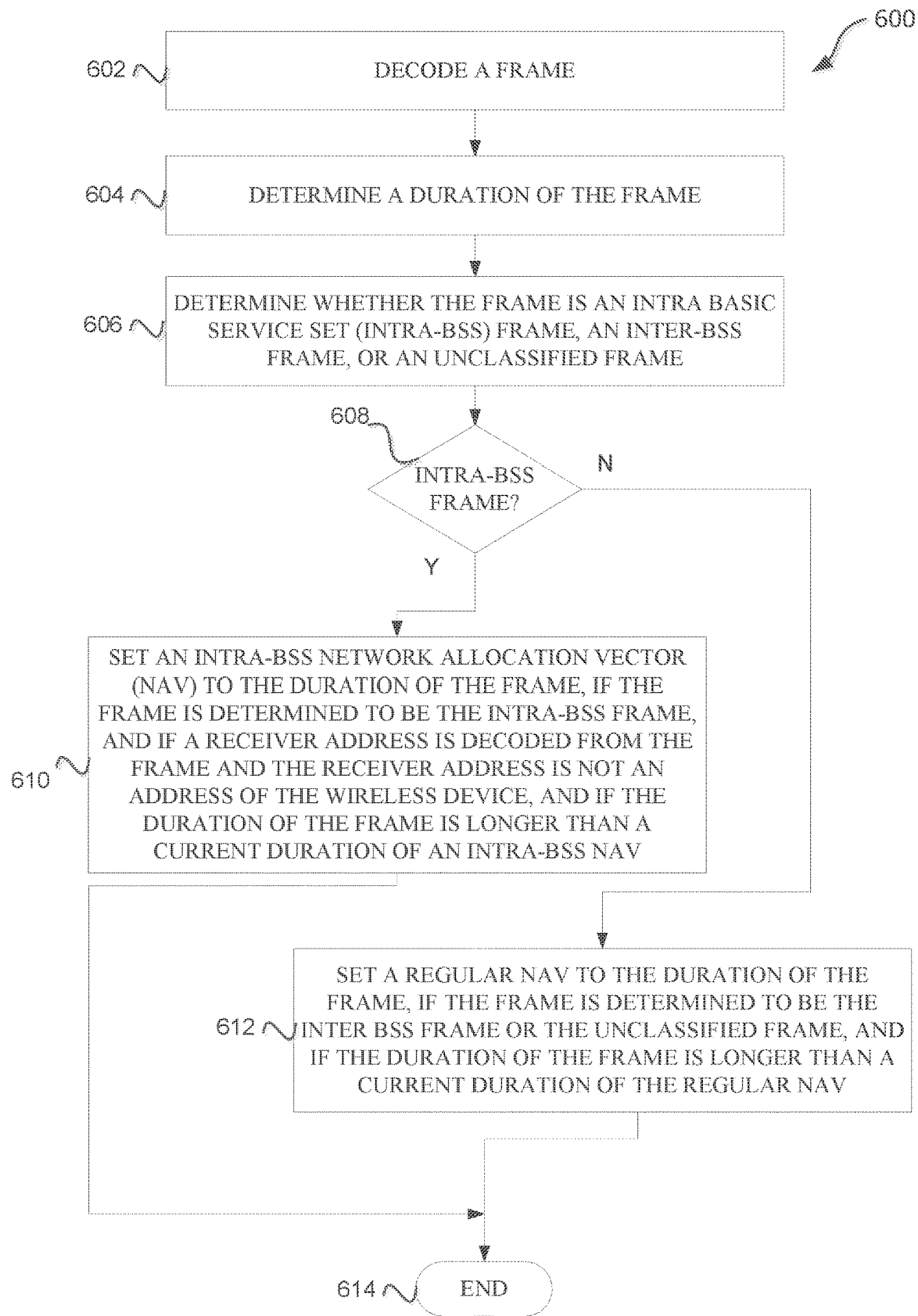
FIG. 6 illustrates a method for virtual carrier sensing with two NAVs, in accordance with some embodiments.

The HE station 104.2 may be configured to determine whether the frame (e.g., transmission 552) is a TDLS frame. If the frame is a TDLS frame, the HE station 104.2 may determine the frame is the intra-BSS frame and store an indication that the intra-BSS NAV 512 is set by a TDLS frame and/or a TA of the frame as a TXOP holder address in the associated information intra 513. FIG. 6 will be described in conjunction with FIG. 5.

In some embodiments, if the regular NAV 514 is set to a first duration, and the transmission 552, which may be a frame, comprises a second BSSID, then the HE station 104.2 may store the second BSSID as the second BSS classifier associated with the regular BSS NAV 514 (e.g. in associated information regular 515), and if the regular NAV is set to the first duration, and the transmission 552, which may be a frame, comprises a transmitter address, or a receiver address, if the frame is a clear-to-send (CTS) frame, then the HE station 104.2 stores the transmitter address or the receiver address as a transmission opportunity holder associated with the regular NAV (e.g., in the associated information regular 515).

FIG. 6 illustrates a method 600 for virtual carrier sensing with two NAVs, in accordance with some embodiments. The method 600 begins with decoding a frame. For example, HE station 104.2 may decode a frame with a receiver address in a MAC portion of the frame. If the HE station 104.2 only decodes he physical (PHY) portion of the frame, then there may not be a receiver address. For example, transmission 552 may be a frame from the master station 102.1 comprising a receiver address.

In the examples below, HE station 104.2 is used as an example, but one skilled in the art would recognize that the master station 102.1 may also perform the functions. The method 600 continues at operation 604 with determining a first duration of the frame. For example, the duration may be indicated in the frame. In some embodiments, if the frame does not include the duration, the wireless device may determine the duration based on a packet type. For example, HE station 104.2 may determine a packet duration based on a packet type. For example, a power save (PS) poll frame may be the packet type. The HE station 104.2 may determine a data rate and determine a value equal to the time, in microseconds, required to transmit one acknowledgment (ACK) frame plus one short interframe space (SIFS). A fractional microsecond is rounded to the next highest integer value.

In some embodiments, the packet may include two durations. A first duration in a PHY portion (e.g., FIG. 9, HE-SIG-A duration 918) of the packet and a second duration in a MAC portion (e.g., FIG. 9, MAC duration 920) of the packet. The PHY duration may use fewer bits and not be as accurate. The wireless device may determine the duration to be the PHY duration at first, and then if the wireless device decodes the MAC portion of the packet determine the duration to be the MAC duration. If the wireless device, does not decode the MAC portion of the packet the duration is determined as the duration in the PHY portion. The PHY portion may be a HE-SIG-A field.

The method 600 continues at operation 606 with determine whether the frame is an intra basic service set (Intra-BSS) frame, an inter-BSS frame, or an unclassified frame. For example, HE station 104.2 may receive transmission 552 which may be a packet. If the packet includes a color that is the same as the color of master station 102.1, then the packet is determined to be an intra-BSS frame. If the packet TA is the same as the address of the master station 102.1, then the packet is determined to be the intra-BSS frame.

In some embodiments, HE station 104.2 determines the frame to be an OBSS frame if the color of the frame is not the same as the color of the master station 102.1 and the color indicates an OBSS. If the HE station 104.2 cannot determine whether the frame is an inter-BSS or intra-BSS frame, the HE station 104.2 determined the frame to be unclassified.

The method 600 continues at operation 608 with is the frame intra-BSS frame. If the frame is an intra-BSS frame, then the method 600 continues at operation 610 with setting an intra-BSS network allocation vector (NAV) to the duration of the frame, if the frame is determined to be the intra-BSS frame, and if a receiver address is decoded from the frame and the receiver address is not an address of the wireless device, and if the duration of the frame is longer than a current duration of an intra-BSS NAV. For example, if the HE station 104.2 determines the transmission 552 is an intra-BSS frame, then the HE station 104.2 may reset the intra-BSS frame to the determined duration of the intra-BSS frame, if that duration is longer than the current value of the intra-BSS NAV 512 and a RA address of the intra-BSS frame is not a MAC address of the HE station 104.2. The method 600 continues to end 614.

The method 600 continues from operation 608 if the frame is not an intra-BSS frame to operation 612 with setting a regular NAV to the duration of the frame, if the frame is determined to be the inter BSS frame or the unclassified frame, and if the duration of the frame is longer than a current duration of the regular NAV. For example, if HE station 104.2 determines the transmission 552 is an inter-BSS frame or an unclassified frame, then HE station 104.2 may set the regular NAV 514 to the duration of the unclassified frame if the duration is longer than a current duration of the regular NAV 514. The method 600 continues to end 614.

Figure 7:
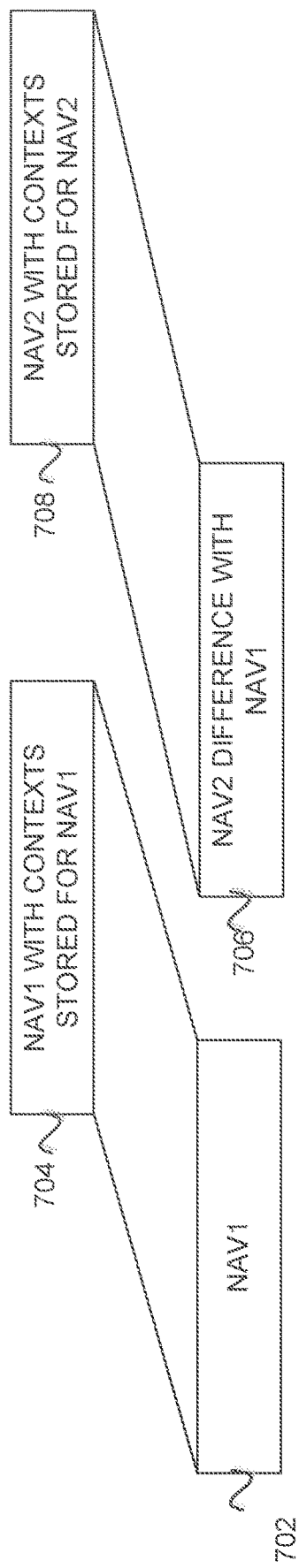
FIG. 7 illustrates an implementation of two NAVs in accordance with some embodiments.

FIG. 7 illustrates an implementation of two NAVs in accordance with some embodiments. Illustrated in FIG. 7 is NAV1 702, NAV2 difference with NAV1 706, NAV1 with contexts stored for NAV1 704, and NAV1 with contexts stored for NAV 2 708. NAV1 702 and NAV2 difference with NAV1 706 may be one of intra-BSS NAV 512 and regular NAV 514. As illustrated NAV1 702 has a greater duration or value than NAV2.

NAV1 with contexts stored for NAV1 704 and NAV1 with contexts stored for NAV 2 708 may be, for example, one of associated information intra 513 or associated information regular 515.

In some embodiments, maintaining two NAVs may require two NAV timers, but this may add to the complexity of the solution. The HE station 104 is configured to determine only if the 2 maintained NAVs has expired or not. This can be achieved through a hardware approach, software approach, or a combination of hardware and software.

For each NAV (e.g., intra-BSS NAV 512 and regular NAV 514), HE station 104 records the timing synchronization function (TSF) value when the NAV is set, and the NAV duration. To check if the NAV has expired, simply compare current TSF and recorded TSF plus NAV duration. If current TSF>recorded TSF+NAV duration, then NAV has expired. If current TFS<recorded TSF+NAV duration, then NAV is valid. This approach does not require any NAV counters/timers.

NAV1 702 may be a counter where the shorter of intra-BSS NAV 512 and regular NAV 514 is loaded. If NAV counter of NAV1 702 or NAV2 difference with NAV1 is larger than 0, then the corresponding NAV is valid.

Intra-BSS NAV 512 and regular NAV 514 may be compared and the shorter of the two is loaded into NAV1 702. If both are invalid then neither is loaded into NAV1 702. If both are valid, then a difference with the shorter of the two is loaded into NAV2 difference with NAV1 706.

Figure 8:
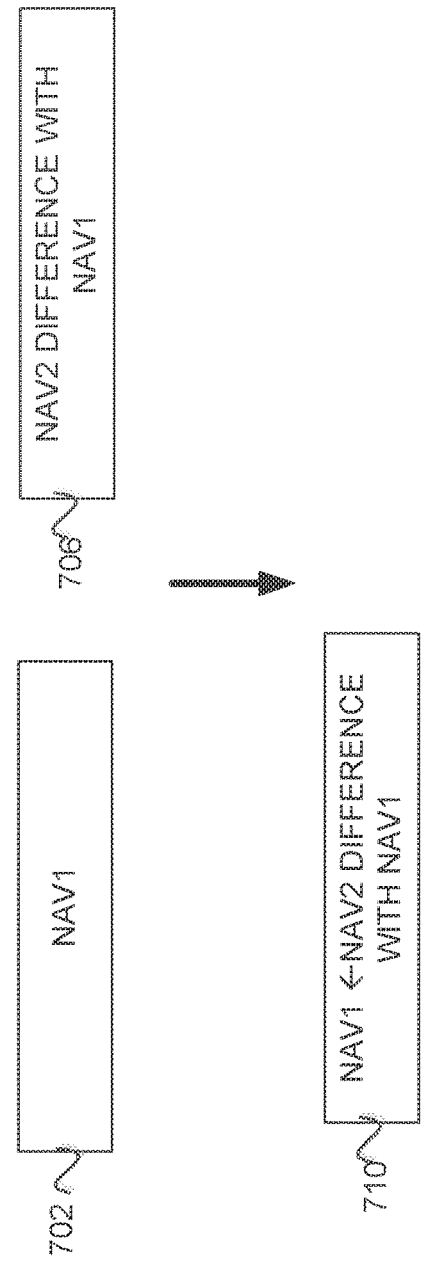
FIG. 8 illustrates when a NAV counter counts to zero in accordance with some embodiments.

FIG. 8 illustrates when a NAV counter counts to zero in accordance with some embodiments. Illustrated in FIG. 8 is NAV1 702, NAV2 difference with NAV1 706 and NAV1←NAV2 DIFFERENCE WITH NAV1 710. If the NAV1 702 counter counts to 0, the HE station 104 may replace NAV1 702 with NAV2 difference with NAV1 706. So, NAV←NAV2 difference with NAV1 710 so now NAV2 is now NAV1.

The HE station 104 may check NAV1 with contexts stored for NAV1 704 and NAV2 with contexts stored for NAV2 708 stored with NAV1 702 and NAV2 difference with NAV1 706, respectively, to find the associated BSSID and TXOP holder address if they are available.

Some embodiments enable a HE station 104 and/or master station 102 to maintain two NAVs so that the HE station 104 and/or master station 102 will not transmit UL MU 220.5 (FIG. 5).

Figure 9:
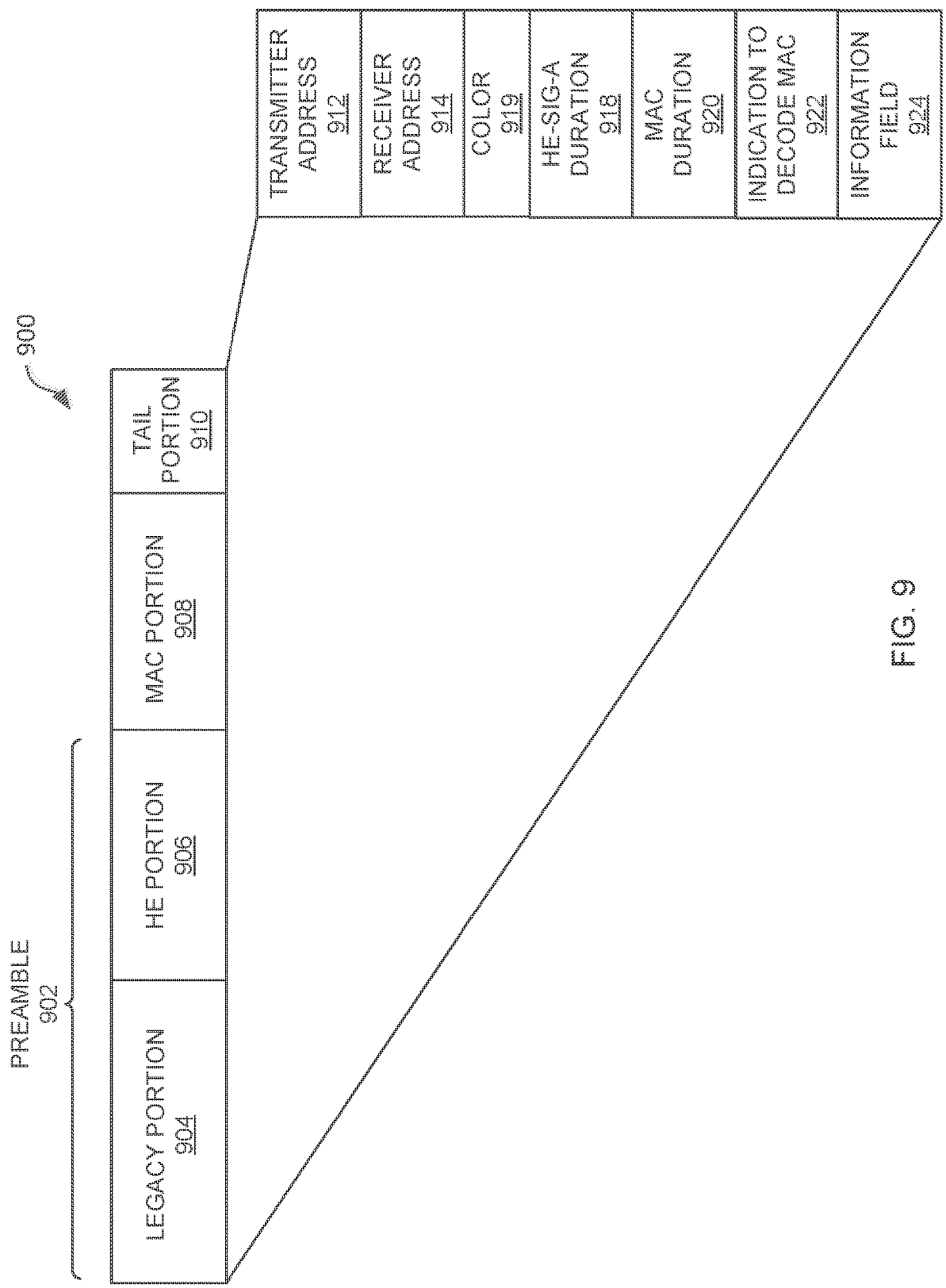
FIG. 9 illustrates a packet in accordance with some embodiments.

FIG. 9 illustrates a packet 900 in accordance with some embodiments. The packet 900 includes a legacy portion 904, HE portion 906, MAC portion 908, and tail portion 910. In some embodiments, the packet 900 may be HE PPDU 200 and/or a HE SU PPDU format. In some embodiments, the packet 900 may be HE PPDU 300 and/or a HE MU PPDU format. In some embodiments, the packet 900 may be a HE PPDU 400 and/or a HE extended range SU PPDU format. In some embodiments, the packet 900 may be HE PPDU 500 and/or a HE trigger-based PPDU format.

The packet 900 may include a transmitter address (TA) 912 field, receiver address (RA) field, color 916 field, HE-SIG-A duration 918 field, a MAC duration 920 field, an indication to decode MAC 922 field, and/or an information field 924. The TA 912 field may be part of the MAC portion 908 and may indicate a transmitter of the packet 900. The RA 914 field may be an intended receiver of the packet 900 address. The RA 914 field may be part of the MAC portion 908. The color 916 field may be an indication or identification of a BSS. The color 916 field may be part of the HE portion 906 and/or the legacy portion 904. The HE-SIG-A duration 918 field may be a duration indicated in the HE portion 906. For example, the HE-SIG-A duration 918 field may be a 7 bit field in a HE-SIG-A field of the HE portion 906. For example, HE-SIG-A duration 918 field may be part of HE-SIG-A 210 field, HE-SIG-A 310 field, HE-SIG-A 410 field, or HE-SIG-A 510 field. The master station 102 and/or the HEW stations 104 may be configured to round up from an actual duration of the packet 900 or a TXOP. MAC duration 920 field may be a duration field in the MAC portion 908 of the packet 900. The MAC duration 920 field may be more bits than the HE-SIG-A duration 918 field. Because the MAC duration 920 field may be more bits, the MAC duration 920 field may be more accurate than the HE-SIG-A duration 918 field.

The HE-SIG-A 918 field may indicate a greater duration than the MAC duration 920 field because the HE station 104 and/or master station 102 may be configured to round up an actual duration due to the fewer bits of the HE-SIG-A duration 918 field compared with the MAC duration 920 field. For example, 7 bits for HE-SIG-A duration 918 field and 11 or 12 bits for the MAC duration 920. The indication to decode MAC 922 field may be an indication in the HE portion 906 that a HE station 104 and/or master station 102 should decode the MAC portion 908. For example, the indication to decode MAC 922 field may be an address indication of the HE station 104 and/or master station 102 that indicates there is a resource allocation and/or a request in the MAC portion 908 for the HE station 104 and/or master station 102 to UL or DL data. In some embodiments, the indication to decode MAC 922 may be indicated by a value of the color 916 field.

The information field 924 may be an indication of HE stations 104 that are to participate in a MU UL data. The information field 924 may be part of the preamble 902 and/or the MAC portion 908.

Figure 10:
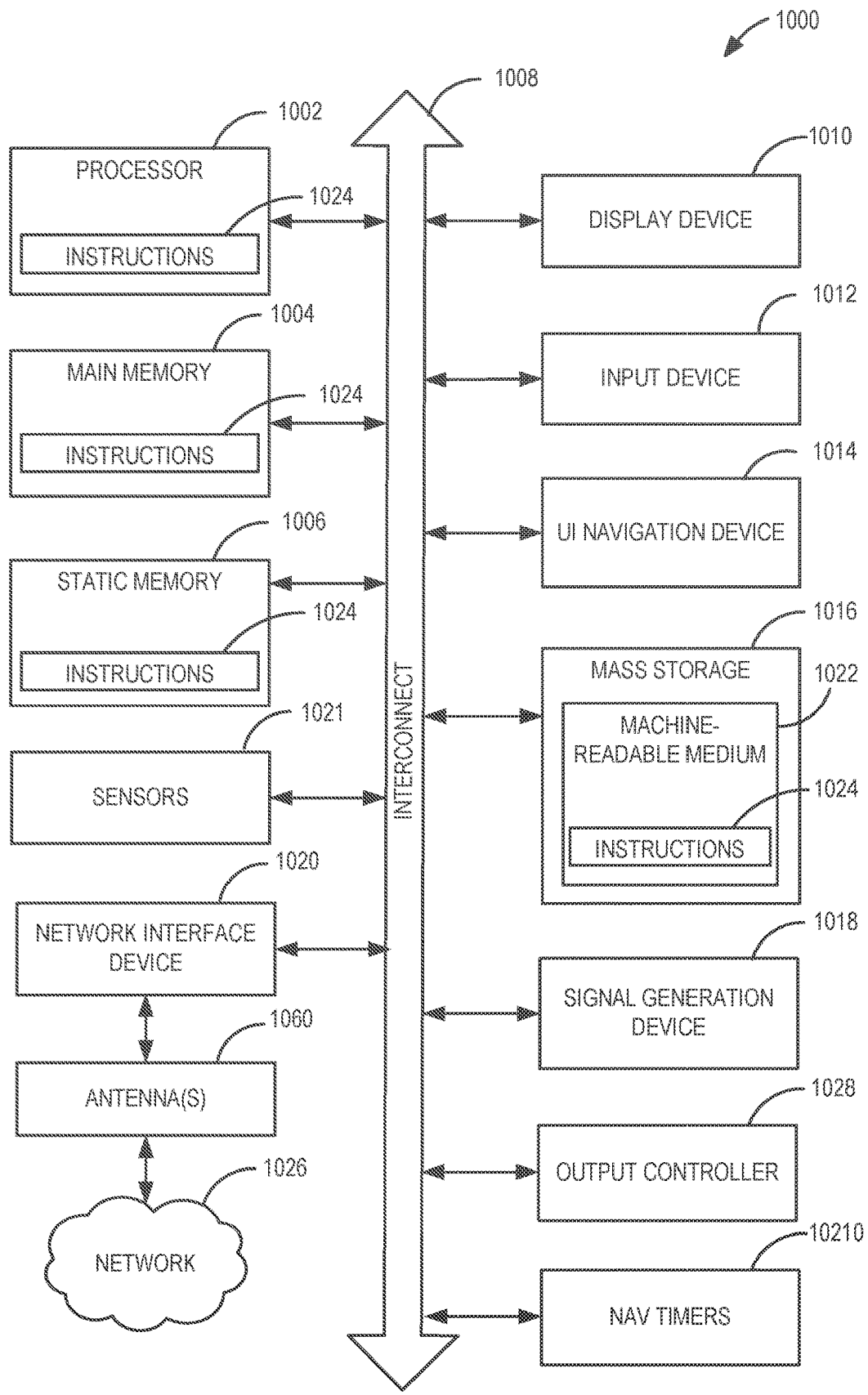
FIG. 10 illustrates a block diagram of an example machine upon which any one or more of the techniques (e.g., methodologies) discussed herein may perform.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display device 1010, an input device 1012 (e.g., a keyboard), and a user interface (UI) navigation device 1014 (e.g., a mouse). In an example, the display device 1010, input device 1012 and UI navigation device 1014 may be a touch screen display. The machine 1000 may additionally include a mass storage (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1002 and/or instructions 1024 may comprise processing circuitry and/or transceiver circuitry. The machine 1000 may further include NAV timers 1029. The NAV timers 1029 may be configured to operate as described herein in conjunction with FIGS. 7 and 8. In some embodiments, the NAV timers 1029 may be configured to generate an interrupt when NAV1 702 reaches zero.

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

An apparatus of the machine 1000 may be one or more of a hardware processor 1002 (e.g., a central processing unit (CPU), a graphics processing unit (GPU), a hardware processor core, or any combination thereof), a main memory 1004, a static memory 1006, instructions 1024, display device 1010, input device 1012, UI navigation device 1014, mass storage 1016, signal generation 1018, output controller 1028, NAV timers 1029, sensors 1021, network interface device 1020, and antennas 1060 some or all of which may communicate with each other via an interlink (e.g., bus) 1008. One or more of the following of the apparatus of the machine 1000 may be separate from the machine 1000 and may be configured to work in conjunction with the machine 1000, be a portion or component of the machine 1000: a hardware processor (e.g., a central processing unit (CPU), a graphics processing unit (GPU), a hardware processor core, or any combination thereof), a main memory, a static memory, instructions, display device, input device, UI navigation device, mass storage, signal generation, output controller, NAV timers, sensors, network interface device, and antennas.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1020 may include one or more physical jacks (e.g., Ethernet, coaxial, or phone jacks) or one or more antennas to connect to the communications network 1026. In an example, the network interface device 1020 may include one or more antennas 1060 to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques. The term "transmission medium" shall be taken to include any intangible medium that is capable of storing, encoding or carrying instructions for execution by the machine 1000, and includes digital or analog communications signals or other intangible medium to facilitate communication of such software.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a wireless device including memory; and processing circuitry coupled to the memory, the processing circuitry configured to: decode a frame; determine a duration of the frame; determine whether the frame is an intra-basic service set (BSS)(intra-BSS) frame, an inter-BSS frame, or an unclassified frame; set an intra-BSS network allocation vector (NAV) to the duration of the frame, if the frame is determined to be the intra-BSS frame, and if a receiver address is decoded from the frame and the receiver address is not an address of the wireless device, and if the duration of the frame is longer than a current duration of the intra-BSS NAV; and set a regular NAV to the duration of the frame, if the frame is determined to be the inter-BSS frame or the unclassified frame, and if the duration of the frame is longer than a current duration of the regular NAV.

In Example 2, the subject matter of Example 1 optionally includes where the processing circuitry is further configured to: associate with a master station; and decode a second frame from the master station, the second frame including an address of the master station or a BSS color; and set a BSS classifier as the address of the master station or the BSS color.

In Example 3, the subject matter of Example 2 optionally includes where the processing circuitry is further configured to: determine the duration of the frame based on a first indication of the duration of the frame in a high-efficiency signal A (HE-SIG-A) field, if the wireless device does not decode a second indication of the duration of the frame in a media access control (MAC) field; and if the wireless device does decode the second indication of the duration in the MAC field, determine the duration of the frame based on the second indication.

In Example 4, the subject matter of Example 3 optionally includes where the processing circuitry is further configured to: if the frame does not comprise the first indication of the duration of the frame or the second indication of the duration of the frame, determine the duration of the frame based on a type of the frame.

In Example 5, the subject matter of any one or more of Examples 3-4 optionally include where the first indication of the duration of the frame is fewer bits than the second indication of the duration of the frame.

In Example 6, the subject matter of any one or more of Examples 2-5 optionally include where the processing circuitry is further configured to: if the intra-BSS NAV is set to the duration of the frame, and the frame comprises a transmitter address, store the transmitter address as a transmission opportunity (TXOP) holder associated with the intra-BSS NAV.

In Example 7, the subject matter of any one or more of Examples 2-6 optionally include where the processing circuitry is further configured to: if the regular NAV is set to the duration of the frame, and the frame comprises a second BSS color, set the second BSS color as a second BSS classifier associated with the regular NAV, where the second BSS color is different from the first BSS color; if the frame is not a clear-to-send (CTS) frame, and if the regular NAV is set to the duration of the frame, and if the frame comprises a transmitter address, store the transmitter address as a transmission opportunity (TXOP) holder associated with the regular NAV; and if the frame is the CTS frame, and if the regular NAV is set to the duration of the frame, store the a receiver address as the TXOP holder associated with the regular NAV.

In Example 8, the subject matter of any one or more of Examples 2-7 optionally include where the processing circuitry is further configured to: if the intra-BSS NAV is set to the duration of the frame, and the frame comprises a second BSS color, set the second BSS color as a second BSS classifier associated with the regular NAV, where the second BSS color is different from the first BSS color; if the frame is not a clear-to-send (CTS) frame, and if the intra-BSS NAV is set to the duration of the frame, and if the frame comprises a transmitter address, store the transmitter address as a transmission opportunity (TXOP) holder associated with the intra-BSS NAV; and if the frame is the CTS frame, and if the intra-BSS NAV is set to the duration of the frame, store the a receiver address as the TXOP holder associated with the intra-BSS NAV.

In Example 9, the subject matter of any one or more of Examples 2-8 optionally include where the processing circuitry is further configured to: if the frame is a contention free end frame, and if the frame is determined to be the intra-BSS frame, reset the intra-BSS NAV; and if the frame is a contention free end frame, and if the frame is determined to be the inter-BSS frame, reset the regular NAV.

In Example 10, the subject matter of any one or more of Examples 2-9 optionally include where the processing circuitry is further configured to: if the frame is a contention free end frame, and if the frame is determined to be the intra-BSS frame, and if the regular NAV is set by a frame that was unclassified, reset the regular NAV.

In Example 11, the subject matter of any one or more of Examples 2-10 optionally include where the processing circuitry is further configured to: contend for a wireless medium if the intra-BSS NAV or the regular NAV are both zero and the wireless device has a second frame to transmit.

In Example 12, the subject matter of any one or more of Examples 2-11 optionally include where the processing circuitry is further configured to: refrain from contending for a wireless medium if the intra-BSS NAV or the regular NAV are nonzero.

In Example 13, the subject matter of any one or more of Examples 2-12 optionally include where the processing circuitry is further configured to: determine whether the frame is a tunneled direct link setup (TDLS) frame; and if the frame is a TDLS frame, determine the frame to be the intra-BSS frame and store an indication that the intra-BSS NAV is set by a TDLS frame.

In Example 14, the subject matter of any one or more of Examples 2-13 optionally include where the wireless device and the master station are each one from the following group: an Institute of Electrical and Electronic Engineers (IEEE) 14 is missing parent: 14 is missing parent: 802.11ax access point, an IEEE 802.11ax station, an IEEE 14 is missing parent: 14 is missing parent: 802.11 station, and an IEEE 802.11 access point.

In Example 15, the subject matter of any one or more of Examples 2-14 optionally include where the processing circuitry is further configured to: determine whether the frame is a tunneled direct link setup (TDLS) frame; if the frame is the TDLS frame, determine the frame to be the intra-BSS frame, store an indication that the intra-BSS NAV is set by a TDLS frame, and store a transmitter address of the frame as a transmission opportunity (TXOP) holder address associated with the intra-BSS NAV.

In Example 16, the subject matter of Example 15 optionally includes where the processing circuitry is further configured to: decode a third frame including a resource allocation for the wireless device to transmit data in an uplink multi-user (UL MU) transmission opportunity; and if the intra-BSS NAV is set during the resource allocation, and the frame that set the intra-BSS NAV is a TDLS frame, do not transmit data in the UL transmission opportunity.

In Example 17, the subject matter of any one or more of Examples 1-16 optionally include transceiver circuitry coupled to the processing circuitry.

Example 18 is a non-transitory computer-readable storage medium that stores instructions for execution by one or more processors, the instructions to configure the one or more processors to cause a wireless device to: decode a frame; determine a duration of the frame; determine whether the frame is an intra-basic service set (BSS)(intra-BSS) frame, an inter-BSS frame, or an unclassified frame; set an intra-BSS network allocation vector (NAV) to the duration of the frame, if the frame is determined to be the intra-BSS frame, and if a receiver address is decoded from the frame and the receiver address is not an address of the wireless device, and if the duration of the frame is longer than a current duration of an intra-BSS NAV; and set a regular NAV to the duration of the frame, if the frame is determined to be the inter BSS frame or the unclassified frame, and if the duration of the frame is longer than a current duration of the regular NAV.

In Example 19, the subject matter of Example 18 optionally includes where the instructions further configure the one or more processors to cause the wireless device to: associate with a master station; and decode a second frame from the master station, the second frame including an address of the master station or a BSS color; and set a BSS classifier as the address of the master station or the BSS color.

In Example 20, the subject matter of any one or more of Examples 18-19 optionally include where the instructions further configure the one or more processors to cause the wireless device to: determine the duration of the frame based on a first indication of the duration of the frame in a high-efficiency signal A (HE-SIG-A) field, if the wireless device does not decode a second indication of the duration of the frame in a media access control (MAC) field; and determine the duration of the frame based on the second indication if the wireless device does decode the second indication of the duration in the MAC field.

Example 21 is a method performed by a wireless device, the method including: decoding a frame; determining a duration of the frame; determining whether the frame is an intra-basic service set (BSS)(intra-BSS) frame, an inter-BSS frame, or an unclassified frame; setting an intra-BSS network allocation vector (NAV) to the duration of the frame, if the frame is determined to be the intra-BSS frame, and if a receiver address is decoded from the frame and the receiver address is not an address of the wireless device, and if the duration of the frame is longer than a current duration of an intra-BSS NAV; and setting a regular NAV to the duration of the frame, if the frame is determined to be the inter BSS frame or the unclassified frame, and if the duration of the frame is longer than a current duration of the regular NAV.

In Example 22, the subject matter of Example 21 optionally includes associating with a master station; and decoding a second frame from the master station, the second frame including an address of the master station or a BSS color; and setting a BSS classifier as the address of the master station or the BSS color.

In Example 23, the subject matter of any one or more of Examples 21-22 optionally include determining the duration of the frame based on a first indication of the duration of the frame in a high-efficiency signal A (HE-SIG-A) field, if the wireless device does not decode a second indication of the duration of the frame in a media access control (MAC) field; and determining the duration of the frame based on the second indication, if the wireless device does decode the second indication of the duration in the MAC field.

Example 24 is an apparatus of a station including: a network allocation vector (NAV) timer; and processing circuitry coupled to the NAV timer, the processing circuitry configured to: store a smaller of a regular NAV and an intra-basic service set (BSS) NAV in the NAV timer; determine a difference between the larger of the regular NAV and the intra-BSS NAV and the smaller of the regular NAV and the intra-BSS NAV; determine when the smaller of the regular NAV and the intra-BSS NAV is zero; and store the difference in the NAV timer.

In Example 25, the subject matter of Example 24 optionally includes where the processing circuitry is further configured to: determine when the smaller of the regular NAV and the intra-BSS NAV is zero by receiving an interrupt from the NAV timer.

Example 26 is an apparatus of a wireless device, the apparatus including: means for decoding a frame; means for determining a duration of the frame; means for determining whether the frame is an intra-basic service set (BSS)(intra-BSS) frame, an inter-BSS frame, or an unclassified frame; means for setting an intra-BSS network allocation vector (NAV) to the duration of the frame, if the frame is determined to be the intra-BSS frame, and if a receiver address is decoded from the frame and the receiver address is not an address of the wireless device, and if the duration of the frame is longer than a current duration of the intra-BSS NAV; and means for setting a regular NAV to the duration of the frame, if the frame is determined to be the inter-BSS frame or the unclassified frame, and if the duration of the frame is longer than a current duration of the regular NAV.

In Example 27, the subject matter of Example 26 optionally includes means for associating with a master station; and means for decoding a second frame from the master station, the second frame including an address of the master station or a BSS color; and means for setting a BSS classifier as the address of the master station or the BSS color.

In Example 28, the subject matter of Example 27 optionally includes means for determining the duration of the frame based on a first indication of the duration of the frame in a high-efficiency signal A (HE-SIG-A) field, if the wireless device does not decode a second indication of the duration of the frame in a media access control (MAC) field; and if the wireless device does decode the second indication of the duration in the MAC field, means for determining the duration of the frame based on the second indication.

In Example 29, the subject matter of Example 28 optionally includes if the frame does not comprise the first indication of the duration of the frame or the second indication of the duration of the frame, means for determining the duration of the frame based on a type of the frame.

In Example 30, the subject matter of any one or more of Examples 28-29 optionally include where the first indication of the duration of the frame is fewer bits than the second indication of the duration of the frame.

In Example 31, the subject matter of any one or more of Examples 27-30 optionally include if the intra-BSS NAV is set to the duration of the frame, and the frame comprises a transmitter address, means for storing the transmitter address as a transmission opportunity (TXOP) holder associated with the intra-BSS NAV.

In Example 32, the subject matter of any one or more of Examples 27-31 optionally include if the regular NAV is set to the duration of the frame, and the frame comprises a second BSS color, means for setting the second BSS color as a second BSS classifier associated with the regular NAV, where the second BSS color is different from the first BSS color; if the frame is not a clear-to-send (CTS) frame, and if the regular NAV is set to the duration of the frame, and if the frame comprises a transmitter address, means for storing the transmitter address as a transmission opportunity (TXOP) holder associated with the regular NAV; and if the frame is the CTS frame, and if the regular NAV is set to the duration of the frame, means for storing the a receiver address as the TXOP holder associated with the regular NAV.

In Example 33, the subject matter of any one or more of Examples 27-32 optionally include if the intra-BSS NAV is set to the duration of the frame, and the frame comprises a second BSS color, means for setting the second BSS color as a second BSS classifier associated with the regular NAV, where the second BSS color is different from the first BSS color; if the frame is not a clear-to-send (CTS) frame, and if the intra-BSS NAV is set to the duration of the frame, and if the frame comprises a transmitter address, means for storing the transmitter address as a transmission opportunity (TXOP) holder associated with the intra-BSS NAV; and if the frame is the CTS frame, and if the intra-BSS NAV is set to the duration of the frame, means for storing the a receiver address as the TXOP holder associated with the intra-BSS NAV.

In Example 34, the subject matter of any one or more of Examples 27-33 optionally include if the frame is a contention free end frame, and if the frame is determined to be the intra-BSS frame, means for resetting the intra-BSS NAV; and if the frame is a contention free end frame, and if the frame is determined to be the inter-BSS frame, means for resetting the regular NAV.

In Example 35, the subject matter of any one or more of Examples 27-34 optionally include if the frame is a contention free end frame, and if the frame is determined to be the intra-BSS frame, and if the regular NAV is set by a frame that was unclassified, means for resetting the regular NAV.

In Example 36, the subject matter of any one or more of Examples 27-35 optionally include means for contending for a wireless medium if the intra-BSS NAV or the regular NAV are both zero and the wireless device has a second frame to transmit.

In Example 37, the subject matter of any one or more of Examples 27-36 optionally include means for refraining from contending for a wireless medium if the intra-BSS NAV or the regular NAV are nonzero.

In Example 38, the subject matter of any one or more of Examples 27-37 optionally include means for determining whether the frame is a tunneled direct link setup (TDLS) frame; and if the frame is a TDLS frame, means for determining the frame to be the intra-BSS frame and store an indication that the intra-BSS NAV is set by a TDLS frame.

In Example 39, the subject matter of any one or more of Examples 27-38 optionally include where the wireless device and the master station are each one from the following group: an Institute of Electrical and Electronic Engineers (IEEE) 39 is missing parent: 39 is missing parent: 802.11ax access point, an IEEE 802.11ax station, an IEEE 39 is missing parent: 39 is missing parent: 802.11 station, and an IEEE 802.11 access point.

In Example 40, the subject matter of any one or more of Examples 27-39 optionally include means for determining whether the frame is a tunneled direct link setup (TDLS) frame; if the frame is the TDLS frame, means for determining the frame to be the intra-BSS frame, store an indication that the intra-BSS NAV is set by a TDLS frame, and store a transmitter address of the frame as a transmission opportunity (TXOP) holder address associated with the intra-BSS NAV.

In Example 41, the subject matter of Example 40 optionally includes means for decoding a third frame including a resource allocation for the wireless device to transmit data in an uplink multi-user (UL MU) transmission opportunity; and if the intra-BSS NAV is set during the resource allocation, and the frame that set the intra-BSS NAV is a TDLS frame, means for refraining from transmiting data in the UL transmission opportunity.

In Example 42, the subject matter of any one or more of Examples 27-41 optionally include means for transmitting and receiving radio waves.

Example 43 is a method performed by a station, the method including: storing a smaller of a regular network allocation vector (NAV) and an intra-basic service set (BSS) NAV in a NAV timer; determining a difference between the larger of the regular NAV and the intra-BSS NAV and the smaller of the regular NAV and the intra-BSS NAV; determining when the smaller of the regular NAV and the intra-BSS NAV is zero; and storing the difference in the NAV timer.

In Example 44, the subject matter of Example 43 optionally includes determining when the smaller of the regular NAV and the intra-BSS NAV is zero by receiving an interrupt from the NAV timer.

Example 45 is a non-transitory computer-readable storage medium that stores instructions for execution by one or more processors, the instructions to configure the one or more processors to cause a station to: store a smaller of a regular network allocation vector (NAV) and an intra-basic service set (BSS) NAV in a NAV timer; determine a difference between the larger of the regular NAV and the intra-BSS NAV and the smaller of the regular NAV and the intra-BSS NAV; determine when the smaller of the regular NAV and the intra-BSS NAV is zero; and store the difference in the NAV timer.

In Example 46, the subject matter of Example 45 optionally includes where the instructions further configure the one or more processors to cause the station to: determine when the smaller of the regular NAV and the intra-BSS NAV is zero by receiving an interrupt from the NAV timer.

Example 47 is a apparatus of a station, the apparatus including: means for storing a smaller of a regular network allocation vector (NAV) and an intra-basic service set (BSS) NAV in a NAV timer; means for determining a difference between the larger of the regular NAV and the intra-BSS NAV and the smaller of the regular NAV and the intra-BSS NAV; means for determining when the smaller of the regular NAV and the intra-BSS NAV is zero; and means for storing the difference in the NAV timer.

In Example 48, the subject matter of Example 47 optionally includes means for determining when the smaller of the regular NAV and the intra-BSS NAV is zero by receiving an interrupt from the NAV timer.

Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising: memory; and, processing circuitry coupled to the memory, the processing circuitry configured to:
    configure the STA to maintain two network allocation vectors (NAVs) including an intra-basic service set (BSS)(intra-BSS) NAV and a basic NAV;
    store the intra-BSS NAV in the memory;
    store the basic NAV in the memory;
    decode a physical layer (PHY) protocol data unit (PPDU);
    classify the PPDU as an intra-BSS PPDU if the PPDU is determined to be an intra-BSS PPDU and classify the PPDU as an inter-BSS PPDU if the PPDU is determined to be an inter-BSS PPDU;
    update the intra-BSS NAV in the memory with a duration indicated by the PPDU, if the PPDU is classified as the intra-BSS frame, the duration indicated by the PPDU is greater than a current value of the intra-BSS NAV, and a receiver address (RA) indicated by the PPDU is not a media access control (MAC) address of the STA; and
    update the basic NAV in the memory with the duration indicated by the PPDU, if the PPDU is classified as the inter-BSS frame or if the PPDU was unable to be classified as either an intra-BSS PPDU or an inter-BSS PPDU and the duration indicated by the PPDU is greater than a current value of the basic NAV.

2. The apparatus of claim 1, wherein the processing circuitry is further configured to:
    if the PPDU comprises a contention free (CF)-end frame and the PPDU is classified as the intra-BSS frame, reset the intra-BSS NAV; and
    if the PPDU comprises the CF-end frame and the PPDU is classified as the inter-BSS frame, reset the basic NAV.

3. The apparatus of claim 1, wherein the processing circuitry is further configured to:
    if the PPDU comprises a contention free (CF)-end frame and the PPDU is classified as the intra-BSS frame and the basic NAV was last updated by an unclassified frame, reset both the intra-BSS NAV and the basic NAV.

4. The apparatus of claim 1, wherein the processing circuitry is further configured to:
    if the PPDU comprises a duration field, set the duration indicated by the PPDU as a duration indicated by the duration field; and
    if PPDU comprises a power save (PS) poll frame, set the duration indicated by the PPDU as a time, in microseconds, required to transit one acknowledgement (ACK) frame plus a time of a short interface space (SIFS).

5. The apparatus of claim 4, wherein the duration indicated by the PPDU is rounded up to a next higher integer.

6. The apparatus of claim 1, wherein update the regular NAV further comprises:
    update the basic NAV with the duration indicated by the PPDU, if the PPDU is classified as the inter-BSS frame or if the PPDU was unable to be classified as either an intra-BSS PPDU or an inter-BSS PPDU, the duration indicated by the PPDU is greater than a current value of the basic NAV, and the RA indicated by the PPDU is not the MAC address of the STA.

7. The apparatus of claim 1, wherein the processing circuitry is further configured to:
    determine a virtual carrier sense is busy if the intra-BSS NAV or the basic NAV are zero.

8. The apparatus of claim 1, wherein the processing circuitry is further configured to:
    in response to the PPDU being a trigger frame from an access point (AP) the STA is associated with, determine whether a virtual carrier sense is busy or idle based on the basic NAV and refrain from considering the intra-BSS NAV.

9. The apparatus of claim 1, wherein the processing circuitry is further configured to:
    determine the duration indicated by the PPDU based on a duration field of a high-efficiency signal A (HE-SIG-A) field, if the STA does not decode an indication of the duration of the PPDU in a media access control (MAC) field; and
    if the STA does decode the indication of the duration in the MAC field, determine the duration of the PPDU based on the indication of the duration in the MAC field.

10. The apparatus of claim 9, wherein the processing circuitry is further configured to:
    if the PPDU does not comprise the duration field of the HE-SIG-A field or the indication of the duration in the MAC field, determine the duration of the PPDU based on a type of a frame of the PPDU.

11. The apparatus of claim 1, wherein the processing circuitry is further configured to:
if the intra-BSS NAV is set to the duration indicated by the PPDU, and the PPDU comprises a transmitter address, store the transmitter address as a transmission opportunity (TXOP) holder associated with the intra-BSS NAV.

12. The apparatus of claim 1, wherein the processing circuitry is further configured to:
contend for a wireless medium if the intra-BSS NAV indicates zero and the basic NAV indicates zero; and
in response to gaining access of the wireless medium, transmit a second PPDU.

13. The apparatus of claim 1, wherein the processing circuitry is further configured to:
classify the PPDU as the intra-BSS PPDU or the inter-BSS PPDU based on a color indicated by a color field of the PPDU.

14. The apparatus of claim 1, wherein the STA is configured to operate in accordance with one or more from the following group: an Institute of Electrical and Electronic Engineers (IEEE) 802.11ax access point, an IEEE 802.11ax station, an IEEE 802.11 station, and an IEEE 802.11 access point.

15. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the PPDU.

16. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the PPDU.

17. A method performed by a station (STA), the method comprising configuring the STA to maintain two network allocation vectors (NAVs) including an intra-basic service set (BSS)(intra-BSS) NAV and a basic NAV;
decoding a physical layer (PHY) protocol data unit (PPDU);
classifying the PPDU as an intra-BSS PPDU if the PPDU is determined to be an intra-BSS PPDU and classify the PPDU as an inter-BSS PPDU if the PPDU is determined to be an inter-BSS PPDU;
updating the intra-BSS NAV with a duration indicated by the PPDU, if the PPDU is classified as the intra-BSS frame, the duration indicated by the PPDU is greater than a current value of the intra-BSS NAV, and a receiver address (RA) indicated by the PPDU is not a media access control (MAC) address of the STA; and
updating the basic NAV with the duration indicated by the PPDU, if the PPDU is classified as the inter-BSS frame or if the PPDU was unable to be classified as either an intra-BSS PPDU or an inter-BSS PPDU and the duration indicated by the PPDU is greater than a current value of the basic NAV.

18. The method of claim 17, wherein the method further comprises:
if the PPDU comprises a contention free (CF)-end frame and the PPDU is classified as the intra-BSS frame, resetting the intra-BSS NAV; and
if the PPDU comprises the CF-end frame and the PPDU is classified as the inter-BSS frame, resetting the basic NAV.

19. A non-transitory computer-readable storage medium that stores instructions for execution by one or more processors of a station (STA), the instructions to configure the one or more processors to:
configuring the STA to maintain two network allocation vectors (NAVs) including an intra-basic service set (BSS)(intra-BSS) NAV and a basic NAV;
decoding a physical layer (PHY) protocol data unit (PPDU);
classifying the PPDU as an intra-BSS PPDU if the PPDU is determined to be an intra-BSS PPDU and classify the PPDU as an inter-BSS PPDU if the PPDU is determined to be an inter-BSS PPDU;
updating the intra-BSS NAV with a duration indicated by the PPDU, if the PPDU is classified as the intra-BSS frame, the duration indicated by the PPDU is greater than a current value of the intra-BSS NAV, and a receiver address (RA) indicated by the PPDU is not a media access control (MAC) address of the STA; and
updating the basic NAV with the duration indicated by the PPDU, if the PPDU is classified as the inter-BSS frame or if the PPDU was unable to be classified as either an intra-BSS PPDU or an inter-BSS PPDU and the duration indicated by the PPDU is greater than a current value of the basic NAV.

20. The non-transitory computer-readable storage medium of claim 19, wherein the one or more processors are further configured to:
if the PPDU comprises a contention free (CF)-end frame and the PPDU is classified as the intra-BSS frame, resetting the intra-BSS NAV; and
if the PPDU comprises the CF-end frame and the PPDU is classified as the inter-BSS frame, resetting the basic NAV.

* * * * *